Patented Jan. 30, 1951

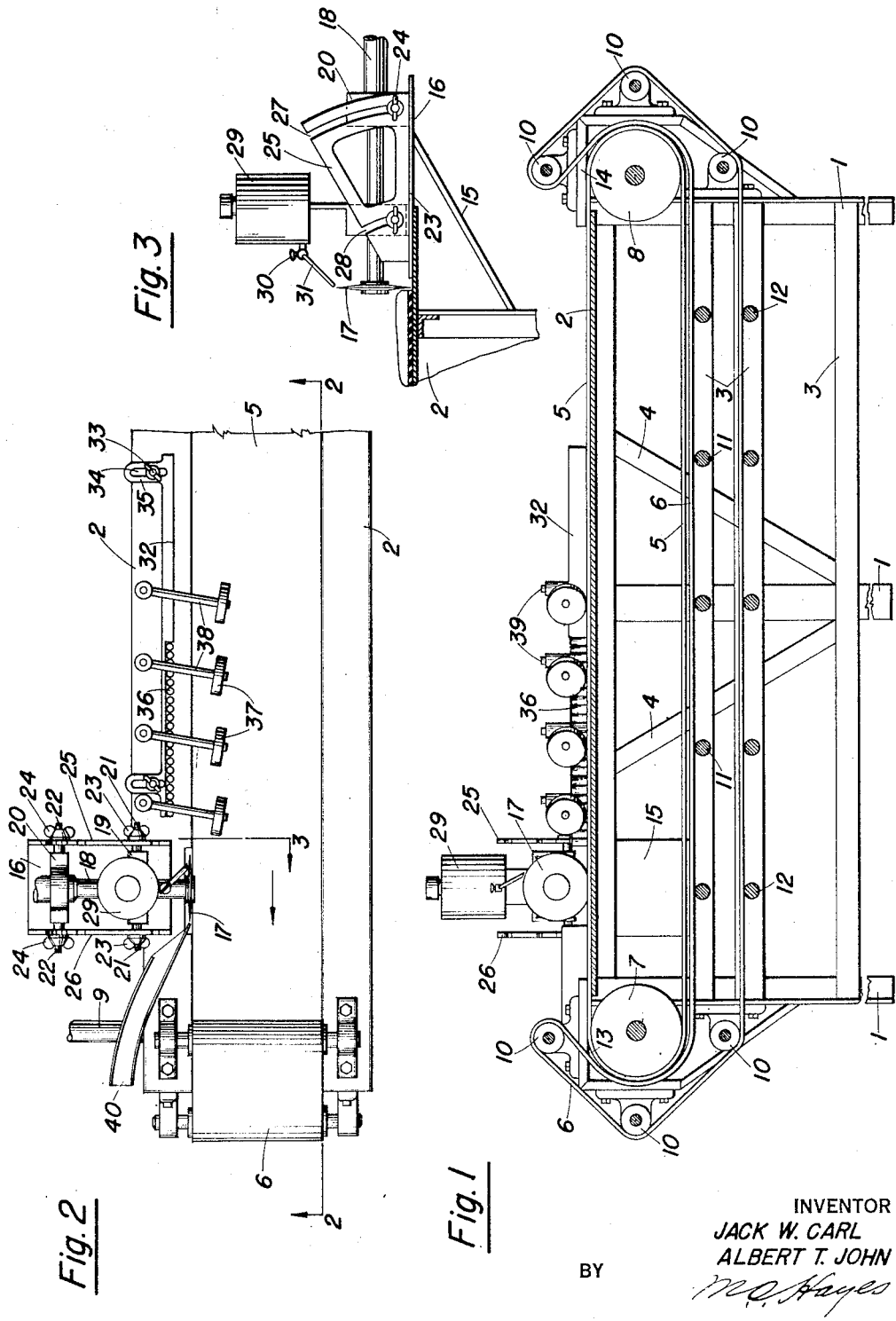

2,539,401

UNITED STATES PATENT OFFICE 2,539,401

CUTTING APPARATUS

Jack W. Carl, Glen Ellen, and Albert T. John, Napa County, Calif.

Application November 21, 1945, Serial No. 630,111

8 Claims. (Cl. 164—61)

(Granted under the act of March 3, 1883, as amended April 30, 1928; 370 O. G. 757)

This invention relates to a cutting apparatus, and more particularly to an apparatus for cutting successive strips from a workpiece composed of rubber or other flexible material.

It is an object of this invention to provide an apparatus for cutting strips of material of a desired width from a workpiece, and particularly from a workpiece made up of rubber or a similar flexible material.

Another object of this invention is to provide an apparatus for repeatedly presenting a workpiece of the character described to a cutting element, and for cutting a strip of predetermined width from said workpiece on each presentation thereof to the cutting element.

In accomplishing these and other objects of the present invention, we have provided improved details of structure, the preferred form of which is illustrated in the accompanying drawing, wherein:

Fig. 1 is a longitudinal sectional view of the cutting apparatus which embodies the features of the present invention, this section being taken along the line 1—1 of Fig. 2.

Fig. 2 is a top plan view of a portion of the apparatus; and

Fig. 3 is a transverse sectional view of a portion of the apparatus, taken along the line 3—3 in Fig. 2.

Referring more in detail to the drawing:

The framework of the apparatus comprises legs 1, a top panel, or platform 2, cross members 3, and braces 4.

Mounted on the framework are two endless conveyor belts 5 and 6. Belt 5 is driven by a drive drum, or pulley, 7 and also passes around an idler drum, or pulley, 8. Drum 7 is driven through a shaft 9 by a power source, not shown. The top of belt 5 is supported by the panel 2.

Belt 6 is an idler belt and moves only as frictional contact is provided with belt 5. The belt 6 passes around idler rollers 10 which are so positioned on the frame adjacent the ends thereof as to keep portions of belt 6 in tight engagement with the belt 5 as the latter pass over drums 7 and 8. The upper portion of belt 6 is supported by idler rollers 11, mounted between opposing cross members of the frame, which act to maintain this portion of the belt in a position adjacent the lower portion of belt 5. Idler rollers 12, also mounted between opposing members on the frame, support the lower portion of belt 6. The relationship between belts 5 and 6 is such that any flexible workpiece positioned on the upper surface of belt 5 as the latter is moved in the direction of the arrow in Fig. 2, is carried into an opening 13 between the belts, passes longitudinally of the apparatus between the belts, and emerges from an opening 14, where the workpiece is once more in position on top of moving belt 5.

Mounted adjacent a side edge of the panel 2, and supported in part by a brace 15, is a plate 16 on which the cutting element of the apparatus and its associated structure are mounted. The said cutting element comprises a circular blade 17 mounted on a rotatable shaft 18 which is journalled in bearings 19 and 20. This shaft, which is connected to a suitable power source (not shown), is adjustably mounted by means of bolts 21 and 22, carrying wing nuts 23 and 24, respectively, between vertically disposed supports 25 and 26. Each of said vertical supports has two arcuate slots therein constructed about a common center which coincides with the lower tip of the cutting edge of the blade 17. Of these slots, those which are furtherest removed from blade 17 are indicated at 27 while the two forward slots are shown at 28. The bolts 22 pass through slots 27 and bolts 21 through slots 28. By varying the relative position of the bolts within the slots, it is evident that blade 17 may be set at varying cutting angles, as desired.

A tank 29 having a lubricant therein is mounted on bearing 19, the lubricant being allowed to pass through valve 30 and tube 31 and onto blade 17 when the valve is placed in the open position.

A work-positioning guide 32 is adjustably mounted on panel 2 adjacent belt 5. The said guide is secured to the panel by means of bolts 33 which are secured in the desired position within slots 34 provided in arms 35 mounted rearwardly of the guide 32. In the form of the invention illustrated herein, a portion of the guide is made up of vertically disposed rollers 36, these rollers being employed that less frictional resistance to the passage of a workpiece be offered by the guide.

A series of rollers 37, mounted by means of arms 38 and pins 39 to the portion of panel 2 which extends outwardly of guide 32, engage the surface of belt 5. These rollers are so mounted that the plane of rotation thereof is oblique to the longitudinal axis of belt 5, being directed toward blade 17. Rollers 37 in general have the effect of drawing a workpiece passing thereunder into engagement with the guide 32.

A chute 40 is mounted on panel 2 adjacent the trailing edge of blade 17, and acts to carry away from the apparatus those portions of the workpiece which are cut by blade 17.

Operation

The manner of operation of the apparatus described above may be described as follows:

The workpiece which is to be cut, as, for example, a sheet of rubber, is placed on belt 5, one side of the workpiece being placed against the guide 32. The power means for the blade 17 and the belt 5 are then set in motion, and a strip of the desired width is cut from the workpiece as it travels under blade 17. The cut strip passes out chute 40, while the remainder of the workpiece passes between belts 5 and 6, which cooperate to carry the workpiece once more into position on the upper surface of belt 5. As the workpiece is carried on belt 5 in the direction of the arrow in Fig. 2, it passes under the rollers 37. Because of the frictional engagement between these rollers and the workpiece, the latter is shifted over to a position against the guide 32, this action being expedited when, as in the preferred practice of my invention, the upper surface of belt 5 is relatively smooth and offers little resistance to the slippage thereover of the workpiece as the latter passes under the rollers 37. In some cases, however, it may be necessary for an operator to assist the rollers in positioning the workpiece against the guide as the former is advanced by belt 5 to the cutting position. This operation may be continued until insufficient material remains in the workpiece to form a strip of the desired width.

The width of the strip may be varied at will by changing the setting of the guide on the supporting panel, while a bevelled edge on the strip may be produced by changing the angle of the cutting blade in the manner described above.

While we have shown but one embodiment of our invention, it is susceptible to modification without departing from the spirit of the invention. We do not wish, therefore to be limited by the disclosures set forth, but only by the scope of the appended claims.

The invention described herein may be manufactured and used by or for the Government of the United States of America for governmental purposes without the payment of any royalties thereon or therefor.

We claim:

1. In an apparatus of the character described, a frame comprising a top panel, and a supporting structure therefore; a driven, endless conveyor belt mounted on said frame, the top portion of said belt passing over said panel; a second endless conveyor belt mounted on said frame and positioned, in part, against portions of said first mentioned belt, said belts being adapted to cooperably engage a workpiece, and repeatedly to present the same in a position on top of said first mentioned belt; a rotatable, driven, cutting means mounted on said frame, the plane of rotation of said cutting means falling along said panel adjacent a side of said first mentioned belt.

2. In an apparatus of the character described, a frame comprising a top panel and a supporting structure therefore; a driven drum and an idler drum mounted on said frame adjacent respective end portions of said panel; an endless conveyor belt mounted about said drums, the top portion of said belt passing over said panel; idler rollers mounted on said frame, and a second endless conveyor belt mounted thereon, said idler rollers maintaining said belts in cooperable engagement adjacent repsective end portions of said panel; guide means mounted on said top panel in a position along a side of said first mentioned belt; and a rotatable, driven, cutting means mounted on said frame, the plane of rotation of said cutting means falling along said top panel adjacent the side of said first mentioned belt on which said guide is mounted.

3. In an apparatus of the character described, a frame comprising a top panel and a supporting structure therefore; a driven drum and an idler drum mounted on said frame adjacent respective end portions of said panel; an endless conveyor belt mounted about said drums and adapted to be driven by said first mentioned drum, the top portion of said belt passing over said top panel; idler rollers mounted on said frame in a position adjacent, and parallel to, said drums; a second endless conveyor belt mounted on said idler rollers, portions of said second belt being maintained by said idler rollers against the portions of said first mentioned belt passing around said drums; idler rollers mounted between opposing frame members and supporting portions of said second mentioned belt in a position adjacent the bottom portions of said first mentioned belt; a guide adjustably mounted on said top panel in a position along a side of said first mentioned belt; a work positioning means mounted on said frame for engaging a workpiece carried on said first mentioned belt and for positioning said workpiece against said guide; and a rotatable, driven, cutting means adjustably mounted on said frame, the plane of rotation of said cutting means, in whatever position of adjustment, being such that the cutting edge of the cutting means is always maintained in the same position along said top panel, and adjacent the side of said first mentioned belt on which said guide is mounted.

4. In an apparatus of the character described, a frame comprising a top panel and a supporting structure therefor; a driven drum and an idler drum mounted on said frame adjacent respective end portions of said panel; an endless conveyor belt mounted about said drums and adapted to be driven by said first mentioned drum, the top portion of said belt passing over said top panel; idler rollers mounted on said frame and supporting a second endless conveyor belt, said second belt being maintained against the portions of said first mentioned belt passing around said drums, and being also maintained adjacent the bottom portion of said first mentioned belt, said belts being adapted to cooperably engage a workpiece and repeatedly to bring the same to a position on top of said first mentioned belt; a guide adjustably mounted on said top panel in a position along a side of said first mentioned belt; a rotatable, driven, cutting means adjustably mounted on said frame, said means comprising a disc, having a sharpened cutting edge, mounted on a driven axle which is adjustably positioned between a plurality of pairs of opposing, concentric arcuate slots provided in opposing upright supports, said slots in each support being constructed about a common center which centers lie in a line tangent to the lower tip of the cutting edge on said disc, the plane of rotation of said disc, in whatever position of adjustment, being such that the cutting edge of the cutting disc is always maintained in the same position along said top panel, and adjacent the side of said first mentioned belt on which said guide is mounted; a work positioning means mounted on said frame, said means comprising rollers mounted for engagement with the upper surface of a workpiece carried along the top portion of said first mentioned belt, the plane of rotation of said rollers being vertically disposed to said panel, oblique to the longitudinal axis of said first mentioned belt, and generally directed toward said cutting means.

5. In an apparatus of the character described, an endless conveyor belt, cutting means positioned to cut a workpiece while said workpiece is carried on top of said conveyor belt, and means including a second endless conveyor belt positioned, in part, about said first endless conveyor belt for automatically returning said workpiece to the top of said first belt after it has been displaced therefrom by the motion of said first belt whereby said workpiece is repeatedly presented in position for cutting on top of said first belt.

6. In an apparatus of the character described, an endless conveyor belt, cutting means positioned adjacent the top of said belt to cut a workpiece while said workpiece is carried on top of said belt, conveyor means closely surrounding the remainder of said belt for automatically returning said workpiece to the top of said belt after it has been displaced therefrom by the motion of said belt, and means for guiding said workpiece while on top of said belt into position to be cut by said cutting means, whereby said workpiece is repeatedly presented to said cutting means for cutting operations.

7. In an apparatus of the character described, an endless conveyor belt, a cutting means positioned adjacent a portion of the upper surface of said belt, and a guide closely surrounding the remaining portions of said belt and spaced therefrom a distance substantially equal to the thickness of a workpiece so that said workpiece can be pressed against said belt for frictional engagement therewith for automatically returning said workpiece to the upper portion of said belt after it has been displaced therefrom by the motion thereof.

8. In an apparatus of the character described, a first endless conveyor belt including upper, lower, and side portions, and a second endless conveyor belt, a portion of which is adjacent the lower and both side portions of said first belt, the adjacent portions of said belts cooperating for automatically returning a workpiece to the upper portion of said first belt after it has been displaced therefrom by the motion thereof.

JACK W. CARL.
ALBERT T. JOHN.

REFERENCES CITED

The following references are of record in the file of this patent:

UNITED STATES PATENTS

| Number | Name | Date |
|---|---|---|
| 156,162 | Jaques | Oct. 20, 1874 |
| 1,116,101 | Nall et al. | Nov. 3, 1914 |
| 1,382,207 | McGuire | June 21, 1921 |
| 1,750,534 | McArthur | Mar. 11, 1930 |
| 1,827,193 | Fisher et al. | Oct. 13, 1931 |
| 1,985,848 | Wean | Dec. 25, 1934 |
| 2,240,424 | Spiess | Apr. 29, 1941 |
| 2,464,173 | Broadmeyer | Mar. 8, 1949 |